United States Patent [19]
Cok

[11] Patent Number: 5,264,924
[45] Date of Patent: Nov. 23, 1993

[54] MECHANISM FOR DERIVING NOISE-REDUCED ESTIMATES OF COLOR SIGNAL PARAMETERS FROM MULTIPLE COLOR/LUMINANCE IMAGE SENSOR OUTPUTS

[75] Inventor: David R. Cok, Rochester, N.Y.

[73] Assignee: Eastman Kodak Company, Rochester, N.Y.

[21] Appl. No.: 451,710

[22] Filed: Dec. 18, 1989

[51] Int. Cl.$^5$ .................. H04N 5/213; H04N 9/00
[52] U.S. Cl. ................................ 358/36; 358/52
[58] Field of Search ............ 358/52, 41, 36, 37, 358/44

[56] References Cited

U.S. PATENT DOCUMENTS

| | | | |
|---|---|---|---|
| 3,501,588 | 3/1970 | Elliott | 358/52 |
| 3,548,083 | 12/1970 | Cahen | 358/52 |
| 3,586,763 | 6/1971 | Schneider | 358/52 |
| 4,245,239 | 1/1981 | Richman | 358/37 |
| 4,591,900 | 5/1986 | Heeb | 358/44 |
| 4,612,570 | 9/1986 | Nakagaki | 358/37 |
| 4,667,160 | 12/1989 | Kinoshita | 358/44 |
| 4,688,085 | 8/1987 | Imaide | 358/44 |

FOREIGN PATENT DOCUMENTS 3496 4/1967 Japan .................... 358/52

Primary Examiner—Tommy Chin
Attorney, Agent, or Firm—Charles E. Wands

[57] ABSTRACT

Color and luminance measurement signals produced by the multiple sensors of a multiband (e.g. RGB color) image signal processing system are processed to reduce noise. For images such as those obtained from a multi-dye film, the luminance component of the output signal from the luminance sensor may be expressed as a function of the color components of the color sensor output signals. A first signal, representative of the constructed low frequency luminance signal, is produced as a linear function of the color sensor output signals, employing signal weighting coefficients derivable from intrinsic characteristics of the scanned image, such as the respective dye densities of a three layer color film. The luminance measurement signal derived from the luminance sensor is subtracted from this first signal, to produce a second signal, which is multiplied by a set of respective scaling factors, which are then subtracted from each color sensor output, so as to derive a set of noise-reduced estimates of the color components of each of the color sensor output signals. Each scaling factor is defined in accordance with the noise variances associated with the operation of the color image sensors and the luminance image sensor, and is proportional to a product of a corresponding one of the coefficients and the ratio of the noise variance associated with the operation of a respective color image sensor to a summation of the noise variances associated with the operation of each of the color sensors and the luminance sensor.

27 Claims, 1 Drawing Sheet

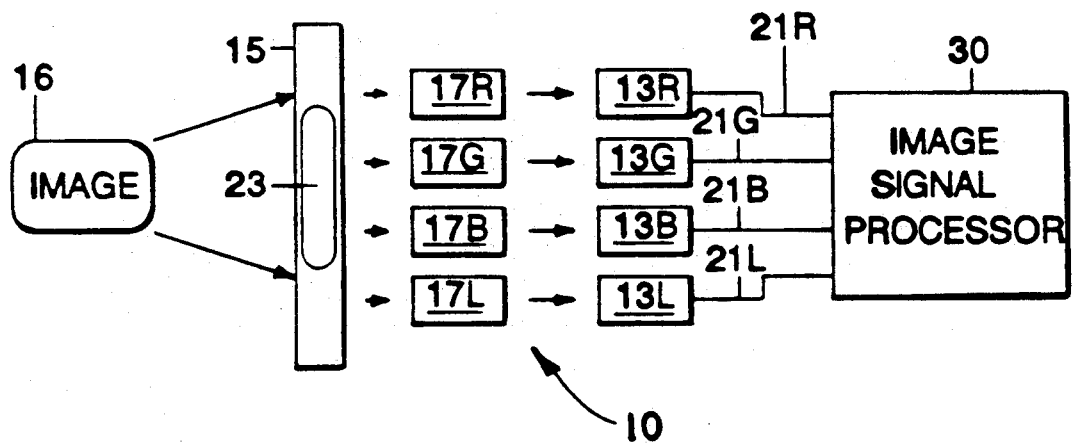

MECHANISM FOR DERIVING NOISE-REDUCED ESTIMATES OF COLOR SIGNAL PARAMETERS FROM MULTIPLE COLOR/LUMINANCE IMAGE SENSOR OUTPUTS

FIELD OF THE INVENTION

The present invention relates in general to color imagery signal processing and is particularly directed to a mechanism for deriving noise-reduced color signal estimates from a multiple sensor color imaging system.

BACKGROUND OF THE INVENTION

Multi-channel signal processing systems often contain a larger number of sensors than there are bands of information to be extracted. Namely, they may be characterized as containing n sensors for deriving m bands of information, where $n > m$. For example, a color imagery sensing system, such as employed for high definition television, may, on occasion, contain four image sensors, three of which provide relatively low spatial resolution measurements of the red, green and blue components of an image, such as the red (R), green (G) and blue (B) density of a color film, while the fourth sensor provides a relatively high spatial resolution, luminance-representative (L) output signal. A low spatial frequency luminance signal is generated by resampling the original high resolution luminance signal, so as to replicate the resolution at which the red, green and blue signals are measured. Subtracting this low frequency luminance from the original luminance signal yields only its high frequency component. (Aside from this subtraction step, the low frequency luminance information is not used.) The resulting high frequency component is then added to the red, green and blue signals to produce high frequency information for these channels.

Due to the imperfect nature of the sensors, each output signal inherently possesses some degree of sensor-induced noise, so that the output may be expressed as the sum of an intended parameter $p_i$, plus a noise component $n_{pi}$ associated with the sensor's measurement of that parameter. Consequently, reducing the magnitude of this noise component would enable the system to provide a more faithful reconstruction of its input image. Fortunately, since a typical film strip contains only three dyes, the system is essentially measuring the values of three parameters (dye densities) on the basis of four measurements (red, green blue and luminance transmittances). Moreover, even when the system is making measurements on a scene which contains a full spectrum of colors (e.g. the real world), because the spectral sensitivity of the luminance sensor usually overlaps that of the other sensors (e.g. RGB color sensors), the (low frequency) luminance component will contain information that is related to the parameter measurements in the color sensor outputs.

SUMMARY OF THE INVENTION

In accordance with the present invention, advantage is taken of this additional source of information in the low frequency luminance signals, so as to reduce the noise in the color signals output by the color sensors. More particularly, the present invention is directed to a multiband (e.g. R,G,B,L) image signal processing system having a plurality of color image sensors, each of which produces a respective color output signal that contains a respective color representative component of the image and a noise component associated with the operation of the color sensor through which its output signal is produced. For images such as those obtained from the above-referenced three layer film, the luminance component of the output signal from the luminance sensor may be expressed as a function of the color components of the color sensor output signals. Namely, the luminance sensor output L may be expressed as the sum of a function f(r,g,b) and the luminance sensor noise $n_L$, where r, g and b are the color components within the color sensor outputs for which reduced-noise estimates are desired.

The signal processing mechanism according to the present invention processes a vector $c_i$ of inputs (intrinsic parameters) and a vector $c_o$ of measurable outputs, related by a function $\bar{c}_o = F(\bar{c}_i)$ which may, in some cases, be approximated by a matrix $\bar{c}_o = \bar{A}c_i$. For a four sensor color imagery processing system, sensor outputs are processed to reduce the noise components in the color sensor output signals and thereby derive noise-reduced estimates of each of the color components within these sensor output signals. To this end, a first signal, S1, which is representative of the low frequency luminance signal, is produced as a linear function of the color sensor output signals, in the form $S1 = (AR + BG + CB)$, where A, B and C are signal weighting coefficients derivable from intrinsic characteristics of the scanned image, such as the respective dye densities of a three layer color film. The luminance measurement signal derived from the luminance sensor is subtracted from this first signal S1, to produce a second signal S2. This second signal S2 is then multiplied by a set of respective scaling factors, which are then subtracted from each color sensor output, so as to derive a set of noise-reduced estimates of the color components of each of the color sensor output signals. Each scaling factor is defined in accordance with the noise variances associated with the operation of the color image sensors and the luminance image sensor, and is proportional to a product of a corresponding one of the coefficients A, B and C, and the ratio of the noise variance associated with the operation of a respective color image sensor to a summation of the noise variances associated with the operation of each of the color sensors and the luminance sensor.

BRIEF DESCRIPTION OF THE DRAWINGS

The single FIGURE diagrammatically shows a color image processing system employing mulitple image sensors and a dedicated color signal processor;

DETAILED DESCRIPTION

Before describing the details of an embodiment of the present invention, it should be observed that the invention resides primarily in a novel color signal noise reduction mechanism, rather than a particular implementation of that mechanism. Moreover, although, in its preferred embodiment, the invention is implemented using a programmed digital computer, the noise reduction mechanism may be carried out by means of a variety of structural combinations of conventional signal processing circuits and components, such as custom-configured integrated circuit hardware. Accordingly, the structure, control and arrangement of the signal processing hardware of an embodiment of the invention have been illustrated in the drawings by a readily understandable block diagram, which shows only those specific details that are pertinent to the present invention, so as not to obscure the disclosure with structural details which will be readily apparent to those skilled in the art having the benefit of the present description.

FIG. 1 illustrates an exemplary application of the present invention to a signal processing environment that employs a first plurality of of n measurements on a second plurality of m intrinsic variables. Specifically, for purposes of the present description, the environment is that of a multi-color image processing system which carries out n=4 measurements on m=3 intrinsic variables and comprises a (multiple sensor) color image section 10, containing red, green, blue and luminance sensitive sensors 13R, 13G, 13B and 13L arranged on one side of a three layer color film strip 15, that is illuminated by light source 16 having a spectral light intensity $I(\lambda)$. Situated in front of the sensors are respective input filters 17R, 17G, 17B and 17L, having respective transmittances $T_r(\lambda)$, $T_g(\lambda)$, $T_b(\lambda)$ and $T_L(\lambda)$. Each sensor produces image characteristic-representative digital signals, i.e. respective red, green, blue and luminance channel signal values representative of the red, green, blue and luminance components of a color image 23 captured on film strip 15 which are coupled over links 21R, 21G, 21B and 21L to a processor 30.

As pointed out above, in the course of operation of such a multi-channel (e.g. three color band, luminance band) image scanning system, the color channel sensors 13R, 13G, 13B provide relatively low spatial resolution measurements of respective red R, green G and blue B components of the film, such as its red, green and blue densities, while the fourth, luminance, sensor 13L provides a relatively high spatial resolution luminance representative output signal. A low spatial frequency luminance signal is generated by resampling the original high resolution luminance signal 21L, so as to replicate the resolution at which the red, green and blue signals are measured. Subtracting this low frequency luminance from the original luminance signal yields only its high frequency component. The resulting high frequency component is then added to the red, green and blue signals to produce high frequency information for these channels.

When film strip 15 is scanned by system 10, the output signals produced by the respective color and luminance sensors 13R, 13G, 13B and 13L contain noise components that are associated with the operation of the sensors themselves. Namely, these noise components are effectively independent of the image and therefore constitute signal processing anomalies that prevent a true reconstruction of whatever comprises the original image as seen by the imaging system. The object of the present invention is to correct or reduce these inserted errors; it does not serve to correct flaws in the original image (within film strip 15).

In terms of signal definitions, each color sensor output may be expressed as the sum of an intended parameter $p_i$, plus a noise component $n_{pi}$ associated with the sensor's measurement of that parameter. Consequently, reducing the magnitude of this noise component will enable the system to provide a more faithful reconstruction of its input image. Fortunately, since film strip 15 typically contains only three dyes, the system is essentially measuring the values of three parameters (dye densities) on the basis of four measurements (red, green blue and luminance transmittances). Moreover, the (low frequency) luminance component L contains information that is related to the parameter measurements in the color sensor outputs.

As noted above, pursuant to the present invention, advantage is taken of this additional source of information in the low frequency luminance signals, to reduce the noise in the color measurement signals R, G and B output by color sensors 13R, 13G and 13R. In order to facilitate an understanding of the signal processing mechanism of the present invention, it is useful to initially define the signal outputs of each of sensors 13 of scanning system 10. Specifially, for an arbitrary pixel within each sensor, R, G and B denote the signals measured by the red, green and blue sensors 13R, 13G, 13B, respectively, and L denotes the low frequency luminance signal (for the same pixel location) for the measured luminance signal. The signal values R, G, B and L may be defined as:

$$R = r + n_r, \tag{1}$$

$$G = g + n_g, \tag{2}$$

$$B = b + n_b, \text{ and} \tag{3}$$

$$L = f(r,g,b) + n_L \tag{4}$$

(Note that this model set of definitions is appropriate for scanning a three-layer film, but not for looking at real-world scenes.) Here each noise value $n_i$ is an independent observation noise which is normally distributed with zero mean and variance $\sigma_i^2$ ($\sigma_i^2$ is the effective noise variance of the noise in the low-frequency luminance signal). The r, g, and b parameters are the "true" or noise-free red, green, and blue transmittances. The function f is the (deterministic) relationship between the red, green, and blue transmittances and the (low-frequency) luminance transmittance. An expression for the function f may be obtained by considering the details of the scanning process.

The scanner uses a light source 16 (with spectral intensity $I(\lambda)$ shining through film 15 containing three color layers with dye densities $d_1$, $d_2$, and $d_3$. The spectral densities per unit die density of these dyes, as a function of wavelength, are $D_1(\lambda)$, $D_2(\lambda)$, and $D_3(\lambda)$. Finally, sensors 13R, 13G, 13B and 13L look at the transmitted light through respective filters 17R, 17G, 17B and 17L with transmittances $T_r(\lambda)$, $T_g(\lambda)$, $T_b(\lambda)$, and $T_L(\lambda)$. If sensors 13R, 13G, 13B and 13L produced noise-free output signals, the respective light intensities that would be measured are:

$$r = \int I(\lambda) 10^{-\Sigma_i d_i D_i(\lambda)} T_r(\lambda) d\lambda \tag{5}$$

$$g = \int I(\lambda) 10^{-\Sigma_i d_i D_i(\lambda)} T_g(\lambda) d\lambda \tag{6}$$

$$b = \int I(\lambda) 10^{-\Sigma_i d_i D_i(\lambda)} T_b(\lambda) d\lambda \tag{7}$$

$$f(r,g,b) = \int I(\lambda) 10^{-\Sigma_i d_i D_i(\lambda)} T_L(\lambda) d\lambda \tag{8}$$

The dye densities $d_i$ of film 15 are derived by solving the equations (5), (6) and (7) and then are used in equation (8) to determine the value of f. For general spectral characteristics, this non-linear equation (8) is the simplest expression for f. However, if the effective filter for the luminance channel is a linear combination of the effective filters for the red, green, and blue channels, then f(r,g,b) is the same linear combination of r, g, and b.

From the sensor measurements for R, G, B, and L, the parameters r, g, and b are to be estimated. From the previous anaylsis, the maximum likelihood (ML) estimate for the parameters is that set of values of $\hat{r}, \hat{g}$ and $\hat{b}$ which maximizes:

$$-(R-\hat{r})^2/\sigma_r^2-(G-\hat{g})^2/\sigma_g^2-(B-\hat{b})^2/\sigma_b^2-(L-f(\hat{r},\hat{g},\hat{b}))^2/\sigma_L^2 \quad (9)$$

Obviously, excluding the knowledge of L gives ML estimates of r, g, and b as the measured values R, G, B, respectively. When the L term is included, the ML estimates r, g, and b satisfy the equations:

$$\hat{r} = R - (\sigma_r^2/\sigma_L^2)(f(\hat{r},\hat{g},\hat{b}) - L) \cdot \frac{df}{dr}(\hat{r},\hat{g},\hat{b}), \quad (10)$$

$$\hat{g} = G - (\sigma_g^2/\sigma_L^2)(f(\hat{r},\hat{g},\hat{b}) - L) \cdot \frac{df}{dg}(\hat{r},\hat{g},\hat{b}), \quad (11)$$

and $$\hat{b} = B - (\sigma_b^2/\sigma_L^2)(f(\hat{r},\hat{g},\hat{b}) - L) \cdot \frac{df}{db}(\hat{r},\hat{g},\hat{b}) \quad (12)$$

For a general function f, equations (10), (11) and (12) will be non-linear and will not have a closed form solution. If the function f is linear in its arguments, however, its solution can be obtained. Thus, if it is assumed that:

$$f(r,g,b) = \alpha r + \beta g + \gamma b \quad (13)$$

Then, equations (10), (11) and (12), respectively, become $$\hat{r} = R - (\alpha\hat{r} + \beta\hat{g} + \gamma\hat{b} - L)\alpha(\sigma_r^2/\sigma_L^2) \quad (14)$$

$$\hat{g} = G - (\alpha\hat{r} + \beta\hat{g} + \gamma\hat{b} - L)\beta(\sigma_g^2/\sigma_L^2) \quad (15)$$

$$\hat{b} = B - (\alpha\hat{r} + \beta\hat{g} + \gamma\hat{b} - L)\gamma(\sigma_b^2/\sigma_L^2) \quad (16)$$

for which the solution is:

$$\hat{r} = R - (\alpha R + \beta G + \gamma B - L)\alpha(\sigma_r^2/\sigma_T^2) \quad (17)$$

$$\hat{g} = G - (\alpha R + \beta G + \gamma B - L)\beta(\sigma_g^2/\sigma_T^2) \quad (18)$$

$$\hat{b} = B - (\alpha R + \beta G + \gamma B - L)\gamma(\sigma_b^2/\sigma_T^2) \quad (19)$$

where:

$$\sigma_T^2 = \sigma_L^2 + \alpha^2\sigma_r^2 + \beta^2\sigma_g^2 + \gamma^2\sigma_b^2 \quad (20)$$

Equations (17), (18) and (19) reveal that each of the values for $\hat{r}, \hat{g},$ and $\hat{b}$ is simply the original measurement for its channel, corrected by a fixed fraction of the quantity $(\alpha R + \beta G + \gamma B - L)$ which is the difference between the luminance signal and a luminance signal constructed from the red, green, and blue measurements.

The rms error of the estimate $\hat{r}$ is:

$$\sigma_r^2(1 - \alpha^2\sigma_r^2/\sigma_T^2) \quad (21)$$

which is strictly less than $\sigma_r^2$ (with corresponding expressions for the error of $\hat{g}$ and $\hat{b}$), so that it can be seen that an improvement can be made in the noise characteristics of the measurements.

This improvement in the noise of the red, green, and blue signals also extends to linear combinations (e.g. differentials) of these signals where Y is luminance (such as an R-Y or B-Y signal). Generating the linear combination M, directly from the measurements R, G, and B as:

$$M = qR + sG + tB \quad (22)$$

yields an rms error of:

$$\sigma_M^2 = q^2\sigma_r^2 + s^2\sigma_g^2 + t^2\sigma_b^2 \quad (23)$$

However, if the combination is defined as:

$$\hat{M} = q\hat{r} + s\hat{g} + t\hat{b}, \quad (24)$$

then the rms error of the estimate becomes (after algebraic simplification):

$$\sigma_{\hat{M}} = \sigma_M^2 - (\alpha q\sigma_r^2 + \beta s\sigma_g^2 + \gamma t\sigma_b^2)^2/\sigma_T^2, \quad (25)$$

which is always the better estimate.

In accordance with a preferred embodiment, the system will not be light-limited, so that the noise level from each sensor will be the same. The low-frequency luminance signal is obtained by averaging four luminance measurements, so that its rms noise is half that of the other channels ($\sigma_r = \sigma_g = \sigma_b = 2\sigma_L$). For exemplary parameters $\alpha = 0.3$, $\beta = 0.6$, and $\gamma = 0.1$, equations (17), (18) and (19) yield:

$$\hat{r} = R - 0.42A \text{ with } \hat{\sigma}_r = (0.93)\sigma_r, \quad (26)$$

$$\hat{g} = G - 0.85A \text{ with } \hat{\sigma}_g = (0.70)\sigma_g, \text{ and} \quad (27)$$

$$\hat{b} = B - 0.14A \text{ with } \hat{\sigma}_b = (0.99)\sigma_b. \quad (28)$$

where:

$$A = 0.3R + 0.6G + 0.1B - L \quad (29)$$

By slightly modifying the coefficients to: $\alpha = 0.4$, $\beta = 0.5$, and $\gamma = 0.1$ the values of $\hat{r}, \hat{g},$ and $\hat{b}$ become:

$$\hat{r} = R - 0.60A \text{ with } \hat{\sigma}_r = (0.87)\sigma_r, \quad (30)$$

$$\hat{g} = G - 0.75A \text{ with } \hat{\sigma}_g = (0.79)\sigma_g, \quad (31)$$

$$\hat{b} = B - 0.15A \text{ with } \hat{\sigma}_b = (0.99)\sigma_b, \quad (32)$$

where:

$$A = 0.4R + 0.5G + 0.1B - L \quad (33)$$

The most significant reduction in noise is in the green channel, where a 20-30% improvement in SNR can be obtained.

The linear definition for f used here holds only correct if the effective spectral transmittance of the luminance channel is a linear combination of the effective spectral transmittances of the red, green, and blue channels. If this is not the case, then f is the more complicated function given above and depends on the spectral characteristics of the light source and the film dyes; the improvement in SNR will also be signal-dependent.

It should be recalled that the noise being discussed here is the noise signals produced by the sensor, i.e., measurement noise. That is, the computed values are estimates of the transmittances through the film strip 15 in the absence of measurement noise, but any noise in the film (e.g. grain) is considered to be part of the signal. In practice, the desired quantities are the signals which gave rise to the film record, prior to any film noise being added to the signal. Since the measurement of blue transmittance contains blue film noise and this measurement is now used to compute the green and red estimates of transmittance, there is the concern that, for example, a noisy blue layer in the flim will add extra noise to the green and red estimates. However, it turns out that this is not the case.

More particularly, with reference to the above-described linear approximation, r, g, and b correspond to the respective red, green, and blue film transmittances, in the absence of both film and measurement noise. If the film noise ($k_r, k_g, k_b$) is additive in intensity space, then the measurements may be defined as:

$$R = r + k_r + n_r, \tag{34}$$

$$G = g + k_g + n_g, \tag{35}$$

$$B = b + k_b + n_b, \text{ and} \tag{36}$$

$$L = \alpha(r+k_r) + \beta(g+k_g) + \gamma(b+k_b) + n_L \tag{37}$$

If the film noise is additive in density space, the definitions are:

$$R = r10^{k_r} + n_r, \tag{38}$$

$$G = g10^{k_g} + n_g, \tag{39}$$

$$B = b10^{k_b} + n_b, \text{ and} \tag{40}$$

$$L = \alpha(r10^{k_r}) + \beta(g10^{k_g}) + \gamma(b10^{k_b}) + n_L \tag{41}$$

In both cases the maximum likelihood estimators are unchanged from the simpler case discussed previously. Consequently, for the additive in intensity space case, the expression for r becomes:

$$\hat{r} = R - (\alpha R + \beta G + \gamma B - L)\alpha(\sigma^2_r/\sigma^2_T) \tag{42}$$

$$= r + k_r + n_r - (\alpha n_r + \beta n_g + \gamma n_b - n_L)\alpha(\sigma^2_r/\sigma^2_T) \tag{43}$$

Similar expressions may be derived for $\hat{g}$ and $\hat{b}$. It should be observed that contributions of $k_g$ and $k_b$ to $\hat{r}$ come from L as well as from G and B, but that these contributions cancel. Thus, the only increase in the rms error of r is the expected contribution from the film noise in the red layer. The same result holds for the case of noise which is additive in density space, and it also holds for linear combinations of red, green, and blue signals. That is, $$\sigma^2_{\hat{r}} = \sigma^2_{k_r} + \sigma^2_r(1 - \alpha^2\sigma^2_r/\sigma^2_T), \tag{44}$$

$$\sigma^2_{\hat{g}} = \sigma^2_{k_g} + \sigma^2_g(1 - \beta^2\sigma^2_g/\sigma^2_T), \tag{45}$$

$$\sigma^2_{\hat{b}} = \sigma^2_{k_b} + \sigma^2_b(1 - \gamma^2\sigma^2_b/\sigma^2_T), \tag{46}$$

$$\sigma^2_M = q^2(\sigma^2_{k_r} + \sigma^2_r) + s^2(\sigma^2_{k_g} + \sigma^2_g) + t^2(\sigma^2_{k_b} + \sigma^2_b) \tag{47}$$

$$\sigma_{\hat{M}} = \sigma_M - (\alpha q\sigma^2_r + \beta s\sigma^2_g + \gamma t\sigma^2_b)^2/\sigma^2_T \tag{48}$$

As will be appreciated from the foregoing description, in accordance with the signal processing mechanism of the present invention, a reduction in noise is possible in a multi-band (e.g. multi-color imagery) signal processing system by using the information contained in a plurality of n observed measurements $\vec{y}$ (e.g. R,G,B,L sensor outputs) related to m intrinsic parameters $\vec{x}$ (e.g. color components) by the expression $\vec{y} = A\vec{x}$. The components of $\vec{y}$ are rescaled by the measurement noise $\sigma_i$ in the measurement $y_i$. Letting $Y'_i = Y_i/\sigma_i$ and "$A'$"$_{ij} = A_{ij}\sigma_i$, so that $\vec{y}' = \vec{A}'\vec{x}$ and the measurement error in each measurement of $\vec{y}'$ is 1.0, then, given a measurement $\vec{y}$, the best estimate of the intrinsic parameters $\hat{x}$ is:

$$\hat{x} = [(A'^+ A')^{-1} A'^+]\hat{y}' \tag{49}$$

where $A'^+$ is the transpose of matrix $A'$. The bracketed quantity in equation (49) depends only upon system characteristics and the measurement noise level. It reduces to equations (17)–(19) for the special case described above.

Thus, in the above-described example of a multi-color imaging processing system the low-frequency luminance signal is used in combination with the red, green, and blue signals. The actual magnitude of the reduction depends on the relative noise levels in the different sensors and on the details of the relationship between the luminance signal and the three color signals. (In the exemplary, but realistic case, a reduction of green measurement noise by 20-30% can be obtained.) If the graininess of the film is included in the noise considerations, the proportional reduction in noise will be smaller, but there are no contributions to noise in one channel due to film noise in another.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the Art.

What is claimed:

1. For use with a multiple band image sensor system having a plurality of first image sensors, each of which produces a respective first sensor output signal that contains an information component representative of a respective characteristic of an image and a noise component associated with the operation of a sensor through which its output signal is produced, and a further image sensor that produces a further sensor output signal containing an information component representative of a further characteristic of said image, and which is expressible as a function of the information components of said first sensor output signals, and a noise component associated with the operation of said further image sensor, a method of processing said first and further sensor output signals to reduce the noise components in said first sensor output signals and thereby derive noise-reduced estimates of each of the information components within said first sensor output signals comprising the steps of:

(a) generating a first signal, representative of said further image sensor signal, as a function of said first sensor output signals;
    (b) generating a second signal representative of a prescribed relationship between said first signal and said further sensor output signal; and
    (c) combining the first sensor output signals produced by said first image sensors with said second signal generated in step (b), to obtain said noise-reduced estimates of the information components of each of said first sensor output signals.

2. A method according to claim 1, wherein step (b) comprises generating said second signal as the difference between said first signal and said further sensor output signal.

3. A method according to claim 2, wherein step (c) comprises subtracting a fraction of said second signal from each of said first sensor output signals to thereby obtain said noise-reduced estimates of the information components of each of said first sensor output signals.

4. A method according to claim 1, wherein step (c) includes generating a plurality of third signals representative of the noise variances associated with the operation of said first image sensors and said further image sensor, and combining the first sensor output signals produced by said first image sensors with the second signal generated in step (b) and said plurality of third signals, to thereby obtain said noise-reduced estimates of the information components of each of said first sensor output signals.

5. A method according to claim 4, wherein a respective one of said third signals is representative of the ratio of the noise variance associated with the operation of a respective first image sensor to a summation of the noise variances associated with the operation of said plurality of first image sensors and said further image sensor.

6. A method according to claim 1, wherein said plurality of first image sensors produce first sensor output signals associated with respectively different color components of said image, and wherein step (a) comprises generating said first signal as a linear function of the respectively different color representative first sensor output signals.

7. A method according to claim 6, wherein said further image sensor produces said further sensor output signal in accordance with a luminance component of said image, and wherein step (b) comprises generating said second signal as the difference between said first signal and said luminance component representative further sensor output signal.

8. A method according to claim 1, wherein said plurality of first image sensors produce said first sensor output signals R, G and B, respectively associated with red, green and blue color components of an image, and wherein step (a) comprises generating said first signal S1 as a linear function of the respective red, green and blue color representative first sensor output signals, in accordance with the relationship:

$$S1 = aR + bG + cB,$$

where a, b, and c are prescribed coefficients.

9. A method according to claim 8, wherein said further image sensor produces said further sensor output signal L in accordance with a luminance component of said image, and wherein step (b) comprises generating said second signal S2 as the difference between said first signal S1 and said luminance component representative further sensor output signal L.

10. A method according to claim 9, wherein step (c) includes generating a plurality of third signals S3, a respective one of which is representative of the ratio of the noise variance associated with the operation of a respective first image sensor to a summation of the noise variances associated with the operation of said plurality of first image sensors and said further image sensor, and combining the first sensor output signals R, G and B produces by said first image sensors with the second signal S2 generated in step (b) and said plurality of third signals, to thereby obtain said noise-reduced estimates of the information components of each of said first sensor output signals.

11. A method according to claim 10, wherein a respective third signal, associated with one of said color components, is proportional to a product of a corresponding one of said coefficients and the ratio of the noise variance associated with the operation of a respective first image sensor to a summation of the noise variances associated with the operation of said plurality of first image sensors and said further image sensor.

12. For use with a multiple band image sensor system having a plurality of first image sensors, each of which produces a respective first sensor output signal that contains an information component representative of a respective characteristic of an image and a noise component associated with the operation of the sensor through which its output signal is produced, and a further image sensor that produces a further sensor output signal containing an information component that is representative of a further characteristic of said image, and is expressible as a function of the information components of said first sensor output signals, and a noise component associated with the operation of said further image sensor, a method of processing said first and further sensor output signals to reduce the noise components in said first sensor output signals and thereby derive noise-reduced estimates of each of the information components within said first sensor output signals, said method comprising the steps of:

(a) generating a first signal, representative of the information component within said further image sensor signal, as a function of said first sensor output signals;

(b) generating a plurality of second signals representative of the noise variances associated with the operation of said first image sensors and said further image sensor; and (c) combining the first and further sensor output signals produced by said first and further image sensors, respectively, with said first signal generated in step (a) and said plurality of second signals generated in step (b), to obtain said noise-reduced estimates of the information components of each of the information components within said first sensor output signals.

13. A method according to claim 12, wherein a respective one of said second signals is representative of the ratio of the noise variance associated with the operation of a respective first image sensor to a summation of the noise variances associated with the operation of said plurality of first image sensors and said further image sensor.

14. A method according to claim 13, wherein said plurality of first image sensors produce said first sensor output signals associated with respectively different color components of said image, and wherein step (a) comprises generating said first signal as a linear function of the respectively different color representative first sensor output signals.

15. A method according to claim 14, wherein said further image sensor produces said further sensor output signal in accordance with a luminance component of said image, and wherein step (c) comprises generating a third signal as the difference between said first signal and said luminance component representative further sensor output signal and subtracting from said first sensor output signals respective combinations of said second and third signals.

16. A method according to claim 15, wherein said plurality of first image sensors produce said first sensor output signals R, G and B, respectively associated with red, green and blue color components of an image, and wherein step (a) comprises generating said first signal S1 as a linear function of the respective red, green and blue color representative first sensor output signals, in accordance with the relationship:

$$S1 = aR + bG + cB,$$

where a, b, and c are prescribed coefficients.

17. A method according to claim 16, wherein said further image sensor produces said further sensor output signal L in accordance with a luminance component of said image, and wherein step (c) comprises generating a third signal as the difference between said first signal S1 and said luminance component representative further sensor output signal L.

18. A method according to claim 17, wherein step (c) includes generating a plurality of second signals, a respective one of which is representative of the ratio of the noise variance associated with the operation of a respective first image sensor to a summation of the noise variances associated with the operation of said plurality of first image sensors and said further image sensor, and combining the first sensor output signals R, G and B produced by said first image sensors with said third signals and said plurality of second signals, to thereby obtain said noise-reduced estimates of the information components of each of said first sensor output signals.

19. A method according to claim 18, wherein a respective one of said second signals, associated with one of said color components, is proportional to a product of a corresponding one of said coefficients and the ratio of the noise variance associated with the operation of a respective first image sensor to a summation of the noise variances associated with the operation of said plurality of first image sensors and said further image sensor.

20. For use with a multiple color image sensor system having a plurality of first image sensors, each of which produces a respective first sensor output signal that contains a respective color representative component of an image and a noise component associated with the operation of a sensor through which its output signal is produced, and a further image sensor that produces a further sensor output signal containing a luminance representative component of said image, and which is expressible as a function of color components of said first sensor output signals, and a noise component associated with the operation of said further image sensor, a method of processing said first and further sensor output signals to reduce the noise components in said first sensor output signals and thereby derive noise-reduced estimates of each of the color components of said first sensor output signals comprising the steps of:

(a) generating a first signal, representative of said further image sensor signal, as a function of said first sensor output signals;

(b) generating a second signal representative of a prescribed relationship between said first signal and said further sensor output signal; and (c) combining the first sensor output signals produced by said first image sensors with said second signal generated in step (b), to obtain said noise-reduced estimates of the color components of each of said first sensor output signals.

21. A method according to claim 20, wherein step (b) comprises generating said second signal as the difference between said first signal and said further sensor output signal, and wherein step (c) comprises subtracting a fraction of said second signal from each of said first sensor output signals to thereby obtain said noise-reduced estimates of the color components of each of said first sensor output signals.

22. A method according to claim 20, wherein step (c) includes generating a plurality of third signals representative of the noise variances associated with the operation of said first image sensors and said further image sensor, and combining the first sensor output signals produced by said first image sensors with the second signal generated in step (b) and said plurality of third signals, to thereby obtain said noise-reduced estimates of the color components of each of said first sensor output signals.

23. A method according to claim 22, wherein a respective one of said third signals is representative of the ratio of the noise variance associated with the operation of a respective first image sensor to a summation of the noise variances associated with the operation of said plurality of first image sensors and said further image sensor.

24. A method according to claim 20, wherein step (a) comprises generating said first signal as a linear function of the respectively different color representative first sensor output signals, and wherein step (b) comprises generating said second signal as the difference between said first signal and said luminance component representative further sensor output signal.

25. A method according to claim 20, wherein said plurality of first image sensors produce said first sensor output signals R, G and B, respectively associated with red, green and blue color components of an image, and wherein step (a) comprises generating said first signal S1 as a linear function of the respective red, green and blue color representative first sensor output signals, in accordance with the relationship:

$$S1 = aR + bG + cB,$$

where a, b, and c are prescribed coefficients, and wherein step (b) comprises generating said second signal S2 as the difference between said first signal S1 and said luminance component representative further sensor output signal.

26. A method according to claim 25, wherein step (c) includes generating a plurality of third signals S3, a respective one of which is representative of the ratio of the noise variance associated with the operation of a respective first image sensor to a summation of the noise variances associated with the operation of said plurality of first image sensors and said further image sensor, and combining the first sensor output signals R, G and B produced by said first image sensors with the second signal S2 generated in step (b) and said plurality of third signals, to thereby obtain said noise-reduced estimates of the color components of each of said first sensor output signals.

27. A method according to claim 26, wherein a respective one of said third signals, associated with one of said color components, is proportional to a product of a corresponding one of said coefficients and the ratio of the noise variance associated with the operation of a respective first image sensor to said summation of the noise variances associated with the operation of said plurality of first image sensors and said further image sensor.

* * * * *